United States Patent
Kolchin et al.

(10) Patent No.: US 9,734,422 B2
(45) Date of Patent: Aug. 15, 2017

(54) SYSTEM AND METHOD FOR ENHANCED DEFECT DETECTION WITH A DIGITAL MATCHED FILTER

(71) Applicant: KLA-Tencor Corporation, Milpitas, CA (US)

(72) Inventors: Pavel Kolchin, Fremont, CA (US); Eugene Shifrin, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/937,409

(22) Filed: Nov. 10, 2015

(65) Prior Publication Data

US 2016/0140412 A1 May 19, 2016

Related U.S. Application Data

(60) Provisional application No. 62/078,802, filed on Nov. 12, 2014.

(51) Int. Cl.
  *G06K 9/00* (2006.01)
  *G06K 9/40* (2006.01)
  (Continued)

(52) U.S. Cl.
  CPC ............. *G06K 9/40* (2013.01); *G06K 9/6202* (2013.01); *G06T 5/002* (2013.01); *G06T 7/001* (2013.01);
  (Continued)

(58) Field of Classification Search
  CPC ....... G06T 5/50; G06T 7/0002; G06T 7/0004; G06T 2207/20212; G06T 2207/30148; H04N 13/0242; H04N 5/357; G06K 9/40
  See application file for complete search history.

(56) References Cited

U.S. PATENT DOCUMENTS 5,805,278 A    9/1998  Danko
8,723,789 B1 *  5/2014  Rafii ...................... G06F 3/011
                                                          345/156
(Continued)

FOREIGN PATENT DOCUMENTS

KR    10-2014-0020716 A    2/2014

OTHER PUBLICATIONS

Matched filter, from Wikipedia, the free encyclopedia, <http://en.wikipedia.org/wiki/Matched_filter>, 8 pages, 26 Jan. 26, 2016.
(Continued)

*Primary Examiner* — Eueng-Nan Yeh
(74) *Attorney, Agent, or Firm* — Suiter Swantz pc llo

(57) ABSTRACT

Enhanced defect detection of a sample includes acquiring two or more inspection images from a sample from two or more locations of the sample for a first optical mode. The defect detection also generates an aggregated defect profile based on the two or more inspection images from the two or more locations for the first optical mode for a selected defect type and calculating one or more noise correlation characteristics of the two or more inspection images acquired from the two or more locations for the first optical mode. Defect detection further includes the generation of a matched filter for the first optical mode based on the generated aggregated defect profile and the calculated one or more noise correlation characteristics.

25 Claims, 12 Drawing Sheets

(51) Int. Cl.
  G06K 9/62 (2006.01)
  G06T 7/00 (2017.01)
  G06T 5/00 (2006.01)
(52) U.S. Cl.
  CPC ............... *G06T 2207/10056* (2013.01); *G06T 2207/20024* (2013.01); *G06T 2207/30024* (2013.01); *G06T 2207/30148* (2013.01)

(56) References Cited

U.S. PATENT DOCUMENTS

| | | |
|---|---|---|
| 2009/0161097 A1 | 6/2009 | Friedrich et al. |
| 2012/0044486 A1 | 2/2012 | Chen et al. |
| 2012/0328181 A1 | 12/2012 | Kitamura et al. |
| 2013/0343632 A1 | 12/2013 | Urano et al. |
| 2015/0332451 A1* | 11/2015 | Amzaleg ................ G06T 7/001 382/149 |

OTHER PUBLICATIONS

N.E. Mastorakis, Multidimensional matched filters, Proceedings of the Third IEEE International Conference on Electronics, Circuits, and Systems, ICECS '96, Oct. 13-16, 1996, pp. 467-470, vol. 1, IE.
Manolakis et al., Applied Digital Signal Processing: Theory and Practice, 2011, p. 860, Cambridge University Press, New York, United States, (published before this application Nov. 2015).
PCT Search Report for PCT/US2015/060207 dated Mar. 31, 2016, 3 pages.

\* cited by examiner

SYSTEM AND METHOD FOR ENHANCED DEFECT DETECTION WITH A DIGITAL MATCHED FILTER

CROSS-REFERENCE TO RELATED APPLICATION

The present application claims the benefit under 35 U.S.C. §119(e) of U.S. Provisional Application Ser. No. 62/078,802, filed Nov. 12, 2014, entitled METHOD TO ENHANCE DEFECT DETECTION IN OPTICAL WAFER INSPECTION BY USING DIGITAL MATCHED FILTER, naming Pavel Kolchin and Eugene Shifrin as inventors, which is incorporated herein by reference in the entirety.

TECHNICAL FIELD

The present invention generally relates to sample inspection and defect detection, and, more particularly, to the improvement of defect detection with the generation and implementation of a matched digital filter.

BACKGROUND

As the demand for integrated circuits having ever-smaller device features continues to increase, the need for improved substrate inspection systems continues to grow. One aspect of inspection tool operation includes the implementation of a digital filter to improve inspection and/or defect detection of a sample, such as a semiconductor wafer. However, current digital filter techniques are limited to predefined digital filter templates. The limited number of digital filter options is insufficient for increasing defect detection sensitivity for challenging inspection and/or defect detection settings. Therefore, it would be desirable to provide a system and method for curing defects such as those identified above.

SUMMARY

A system for enhanced defect detection with a matched filter is disclosed, in accordance with one or more illustrative embodiments of the present disclosure. In one embodiment, the system includes an inspection sub-system. In another embodiment, the inspection sub-system includes an illumination source configured to direct illumination onto one or more selected portions of the sample and one or more detectors configured to acquire two or more inspection images from the sample from two or more locations of the sample for a first optical mode. In another embodiment, the system includes a controller communicatively coupled to the one or more detectors. In another embodiment, the controller includes one or more processors configured to execute program instructions configured to cause the one or more processors to: receive the two or more inspection images acquired from the two or more locations from the one or more detectors for the first optical mode; generate an aggregated defect profile based on the two or more inspection images from the two or more locations received from the one or more detectors for the first optical mode for a selected defect type; calculate one or more noise correlation characteristics of the two or more inspection images acquired from the two or more locations for the first optical mode; and generate a matched filter for the first optical mode based on the generated aggregated defect profile and the calculated one or more noise correlation characteristics.

A method for enhanced defect detection with a matched filter is disclosed, in accordance with one or more illustrative embodiments of the present disclosure. In one embodiment, the method includes acquiring two or more inspection images from a sample from two or more locations of the sample for a first optical mode. In another embodiment, the method includes generating an aggregated defect profile based on the two or more inspection images from the two or more locations for the first optical mode for a selected defect type. In another embodiment, the method includes calculating one or more noise correlation characteristics of the two or more inspection images acquired from the two or more locations for the first optical mode. In another embodiment, the method includes generating a matched filter for the first optical mode based on the generated aggregated defect profile and the calculated one or more noise correlation characteristics.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1A through 2I, a system and method for the generation and application of a digital matched filter for defect detection is described in accordance with the present disclosure.

Embodiments of the present disclosure are directed to the enhancement and improvement of defect detection in optical sample inspection. Embodiments of the present disclosure may achieve improved defect detection capabilities through the formation and application of a matched filter, which results in in higher sensitivity to targeted defect types. Embodiments of the present disclosure can also be used to increase the detection rate of defects of interest (DOIs) and/or simultaneously reduce the detection rate of nuisance events. Additional embodiments of the present disclosure allow for the identification of a target defect profile in an optical image with high surrounding noise.

Embodiments of the present disclosure acquire two or more inspection images from a sample from two or more locations of the sample for a first optical mode. Additional embodiments of the present disclosure generate an aggregated (e.g., aligned and averaged) defect profile based on the two or more inspection images from the two or more locations for the first optical mode for a selected defect type. Additional embodiments of the present disclosure calculate one or more noise correlation characteristics of the two or more inspection images acquired from the two or more locations for the first optical mode. Additional embodiments of the present disclosure generate a matched filter for the first optical mode based on the generated aggregated defect profile and the calculated one or more noise correlation characteristics. Based on the generated matched filter of the present disclosure, additional embodiments apply the matched filter to one or more inspection images to provide enhanced defect detection.

Figure 1A:
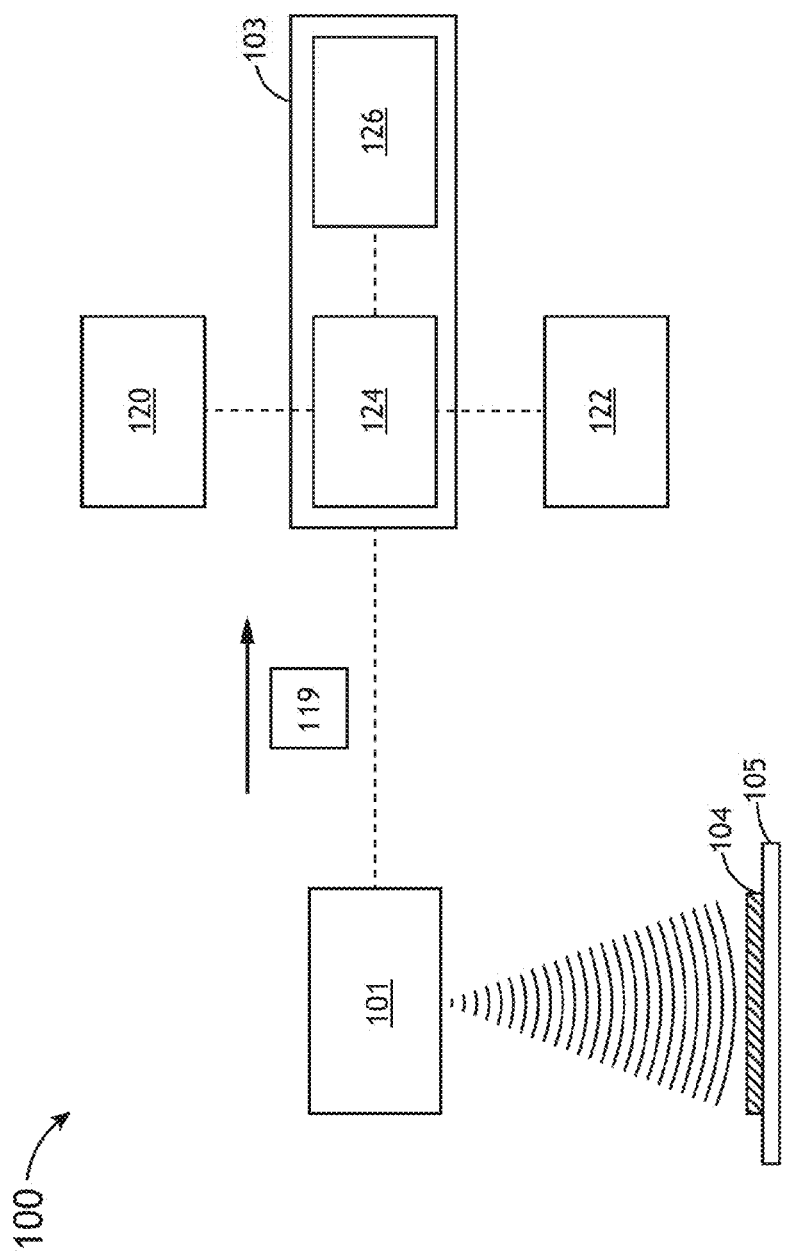
FIG. 1A is a conceptual view of system for enhanced defect detection with a matched filter, in accordance with one embodiment of the present disclosure.

FIG. 1A illustrates a conceptual view of a system 100 for enhanced defect detection with a matched filter, in accordance with one embodiment of the present disclosure. In one embodiment, the system 100 includes an inspection sub-system 101. The inspection sub-system 101 is configured to perform one or more optical inspections of one or more samples 104. For example, the inspection sub-system 101 may acquire one or more inspection images 119 of one or more portions of the surface of sample 104.

Figure 1B:
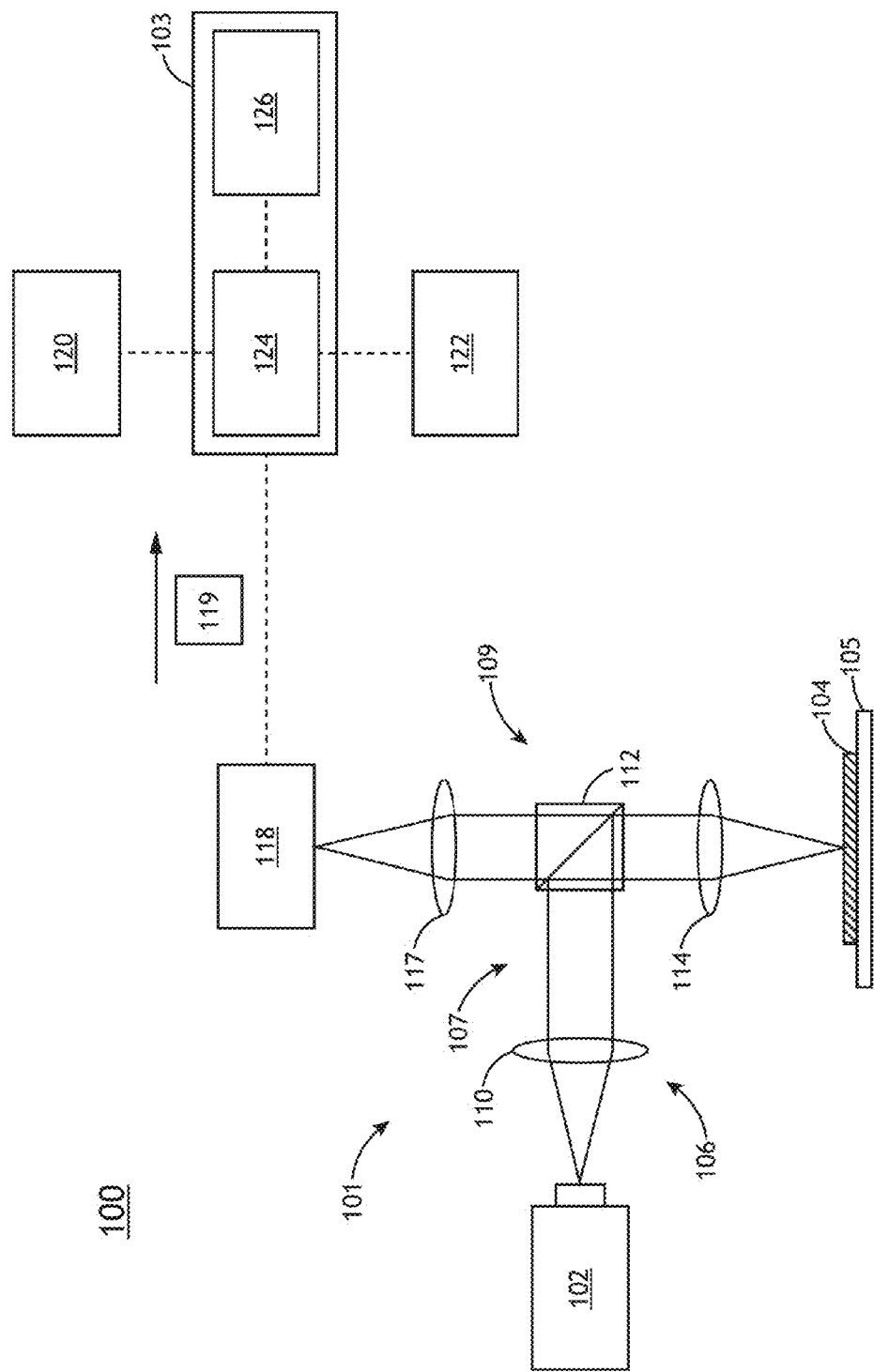
FIG. 1B is a simplified schematic view of the system for enhanced defect detection with a matched filter in a brightfield inspection configuration, in accordance with one embodiment of the present disclosure.
Figure 1C:
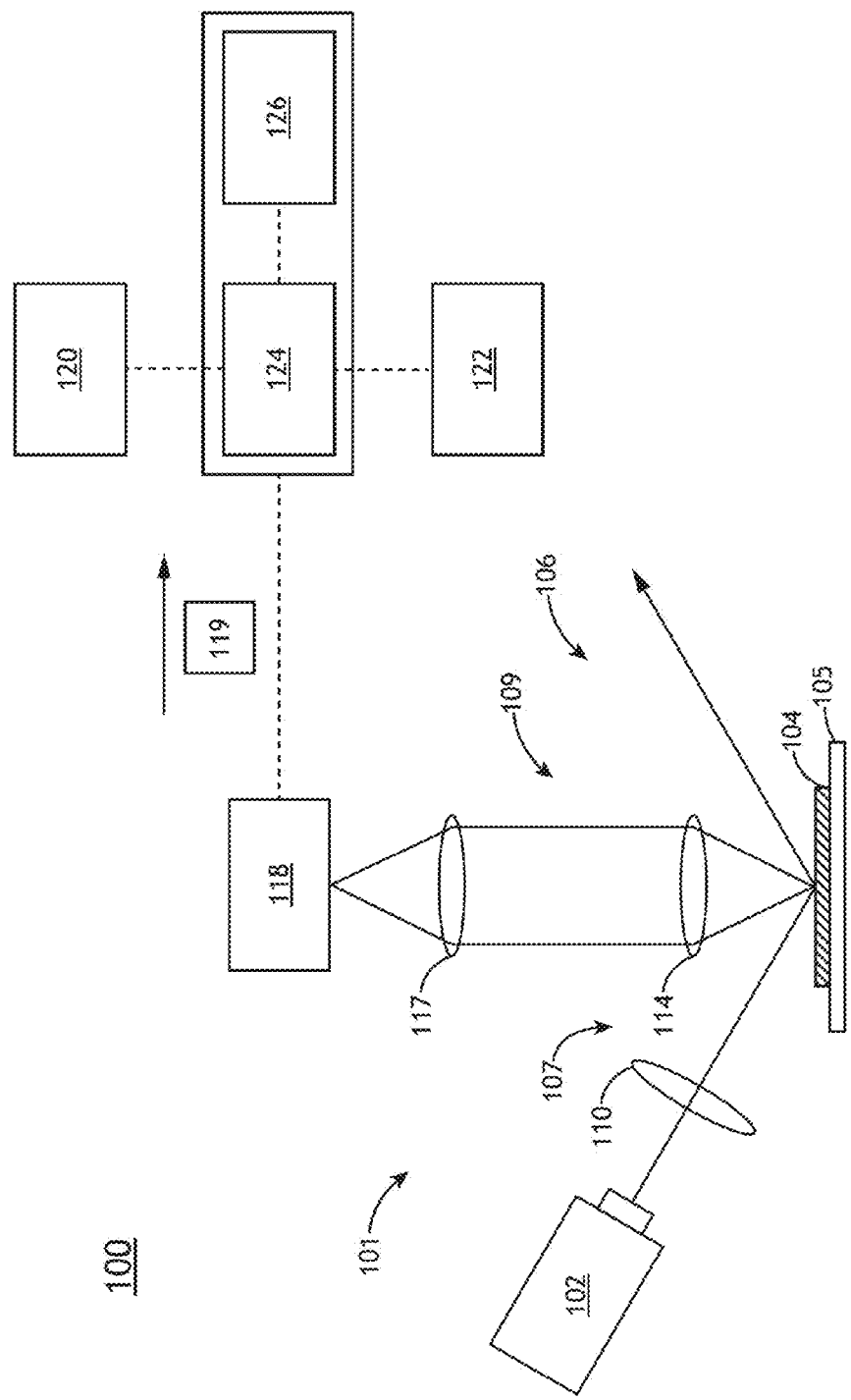
FIG. 1C is a simplified schematic view of the system for enhanced defect detection with a matched filter in a darkfield inspection configuration, in accordance with one embodiment of the present disclosure.

The inspection sub-system 101 may include any inspection sub-system or tool known in the art of sample inspection, such as, but not limited to, an optical inspection tool. For example, in the case of optical inspection, the inspection sub-system 101 may include, but is not limited to, a brightfield inspection tool, as shown in FIG. 1B, or a dark-field inspection tool, as shown in FIG. 1C. It is noted herein that for purposes of simplicity the inspection sub-system 101 has been depicted in FIG. 1A in the form of a conceptual block diagram. This depiction, including the components and optical configuration, is not limiting and is provided for illustrative purposes only. It is recognized herein that the inspection sub-system 101 may include any number of optical elements, illumination sources, and detectors to carry out the inspection process(es) described herein.

FIG. 1B illustrates a simplified schematic view of system 100 in a brightfield inspection configuration, in accordance with one or more embodiments of the present disclosure.

FIG. 1C illustrates a simplified schematic view of system 100 in a darkfield inspection configuration, in accordance with one or more embodiments of the present disclosure.

In one embodiment, the inspection sub-system 101 includes an illumination source 102. The illumination source 102 may include any illumination source known in the art of sample inspection. For example, the illumination source 102 may include, but is not limited to, a narrowband illumination source. For instance, the illumination source 102 may include, but is not limited to, a laser (e.g., diode laser, a continuous wave laser, or a broadband laser). In another embodiment, the illumination source 102 may include, but is not limited to, a broadband source. For instance, the illumination source 102 may include, but is not limited to, a broadband lamp (e.g., discharge lamp, laser-sustained plasma lamp, and the like).

In one embodiment, the inspection sub-system 101 includes a sample stage 105 for securing the one or more samples 104 (e.g., one or more semiconductor wafers). The sample stage may include any sample stage known in the art of sample inspection. For example, the sample stage 105 may include, but is not limited to, a rotational sample stage, a linear sample stage, or a combination of a rotational sample stage and a linear sample stage. While much of the present disclosure focuses on the implementation of system 100 in the context of semiconductor wafer inspection, this is not a limitation of the present disclosure. It is recognized herein that the system 100 may be extended to any inspection setting known in the art, including, but not limited to, semiconductor device inspection, reticle inspection, biological specimen inspection, and the like.

In one embodiment, the inspection sub-system 101 includes an optical sub-system 106. The optical sub-system 106 may include any number and type of optical components necessary for directing illumination from the illumination source 102 to the sample 104 and collecting scattered and/or reflected light from sample.

In one embodiment, the optical sub-system 106 includes illumination arm 107 and collection arm 109. The illumination arm 107 may include one or more illumination optical elements for directing illumination from the illumination source 102 to a surface of a sample 104 and/or conditioning the illumination from the illumination source 102. For example, the one or more optical elements of the illumination arm 107 of the optical sub-system 106 may include, but are not limited to, one or more lenses, one or more beam splitters, one or more pupil masks, one or more mirrors, one or more filters, or one or more polarizers. In one embodiment, the one or more illumination optics of the illumination arm 107 are arranged to direct illumination from the illumination source 102 to the sample 104 through the objective 110. For instance, the illumination arm 107 may include one or more lenses 114 and a beam splitter 112 for focusing and directing light onto a selected portion of the sample 104 through objective 110.

The collection arm 109 may include one or more collection optical elements for collecting illumination from the sample 104 and/or conditioning the illumination from the sample 104. For example, the one or more optical elements of the collection arm 109 of the optical sub-system 106 may include, but are not limited to, one or more beam splitters, one or more lenses, one or more mirrors, one or more filters, or one or more polarizers. In one embodiment, the objective 114 is arranged so as to collect light scattered, reflected and/or diffracted from the sample 104. Further, the collection arm 109 may include one or more additional optical elements (e.g., one or more lenses 117) for directing light collected by the objective 114 onto the imaging portion of one or more detectors 118.

The one or more detectors 118 may include any detector or sensor known in the art of inspection. For example, the detector 118 of the inspection sub-system 101 may include, but is not limited to, one or more TDI detectors or one or more CCD detectors.

It is noted herein that for purposes of simplicity the inspection sub-system 101 has been depicted in FIGS. 1B-1C in the form of simplified block diagrams. This depiction, including the components and optical configuration, is not limiting and is provided for illustrative purposes only. It is recognized herein that the sub-system 101 may include any number of optical elements, illumination sources, and detectors to carry out the inspection process(es) described herein. Examples of inspection tools are described in detail in U.S. Pat. No. 7,092,082, U.S. Pat. No. 6,702,302, U.S. Pat. No. 6,621,570 and U.S. Pat. No. 5,805,278, which are each incorporated herein by reference in the entirety.

In another embodiment, the system 100 includes a controller 103. In one embodiment, the controller 103 is communicatively coupled to the inspection sub-system 101. For example, the controller 103 may be coupled to the output of one or more detectors 118 of the inspection sub-system 101. The controller 103 may be coupled to the one or more detectors 118 in any suitable manner (e.g., by one or more transmission media indicated by the line shown in FIGS. 1A-1C) such that the controller 103 can receive the inspection images 119 acquired from the sample 104 by the one or more detectors 118 of the inspection sub-system 101.

In one embodiment, the controller 103 includes one or more processors 124. In one embodiment, the one or more processors 124 are configured to execute a set of program instructions stored in memory 126. In another embodiment, the program instructions are configured to cause the one or more processors 124 to receive the two or more inspection images 119 acquired by the one or more detectors 118 from two or more locations of sample 104 for a first optical mode. In another embodiment, the program instructions are configured to cause the one or more processors 124 to generate an aggregated defect profile based on the two or more inspection images 119 from the two or more locations for the first optical mode for a selected defect type. In another embodiment, the program instructions are configured to cause the one or more processors 124 to calculate one or more noise correlation characteristics of the two or more inspection images 119 acquired from the two or more locations of sample 104 for the first optical mode. In another embodiment, the program instructions are configured to cause the one or more processors 124 to generate a matched filter for the first optical mode based on the generated aggregated defect profile and the calculated one or more noise correlation characteristics.

The one or more processors 124 of controller 103 may include any one or more processing elements known in the art. In this sense, the one or more processors 124 may include any microprocessor-type device configured to execute software algorithms and/or instructions. In one embodiment, the one or more processors 124 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 126. Moreover, different subsystems of the system 100 (e.g., inspection sub-system 101, display 122, or user interface 120) may include processor or logic elements suitable for carrying out at least a portion of the steps described throughout the present disclosure. Therefore, the above description should not be interpreted as a limitation on the present disclosure but merely an illustration.

The memory medium 126 may include any storage medium known in the art suitable for storing program instructions executable by the associated one or more processors 124. For example, the memory medium 126 may include a non-transitory memory medium. For instance, the memory medium 126 may include, but is not limited to, a read-only memory, a random access memory, a magnetic or optical memory device (e.g., disk), a magnetic tape, a solid state drive and the like. In another embodiment, the memory 126 is configured to store one or more results from the inspection sub-system 101 and/or the output of the various steps described herein. It is further noted that memory 126 may be housed in a common controller housing with the one or more processors 124. In an alternative embodiment, the memory 126 may be located remotely with respect to the physical location of the processors and controller 103. For instance, the one or more processors 124 of controller 103 may access a remote memory (e.g., server), accessible through a network (e.g., internet, intranet, and the like). In another embodiment, the memory medium 126 maintains program instructions for causing the one or more processors 124 to carry out the various steps described through the present disclosure.

In another embodiment, the system 100 includes a user interface 120. In one embodiment, the user interface 120 is communicatively coupled to the one or more processors 124 of controller 103. In another embodiment, the user interface 120 may be utilized by controller 103 to accept selections and/or instructions from a user. In some embodiments, described further herein, a display 122 may be used to display data to a user. In turn, a user may input selection and/or instructions (e.g., selection, sizing and/or position of filter box) responsive to data displayed to the user via the user interface 120.

The user interface 120 may include any user interface known in the art. For example, the user interface 120 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel mounted input device, or the like. In the case of a touchscreen interface device, those skilled in the art should recognize that a large number of touchscreen interface devices may be suitable for implementation in the present invention. For instance, the display 122 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display 122 is suitable for implementation in the present disclosure.

The display 122 may include any display device known in the art. In one embodiment, the display 122 may include, but is not limited to, a liquid crystal display (LCD), an organic light-emitting diode (OLED) based display, or a CRT display. Those skilled in the art should recognize that a variety of display devices may be suitable for implementation in the present disclosure and the particular choice of display device may depend on a variety of factors, including, but not limited to, form factor, cost, and the like. In a general sense, any display device capable of integration with a user interface device (e.g., touchscreen, bezel mounted interface, keyboard, mouse, trackpad, and the like) is suitable for implementation in the present disclosure.

In some embodiments, the system 100 described herein may be configured as a "stand alone tool" or a tool that is not physically coupled to a process tool. In other embodiments, such an inspection system may be coupled to a process tool (not shown) by a transmission medium, which may include wired and/or wireless portions. The process tool may include any process tool known in the art such as a lithography tool, an etch tool, a deposition tool, a polishing tool, a plating tool, a cleaning tool, or an ion implantation tool. The results of inspection performed by the systems described herein may be used to alter a parameter of a process or a process tool using a feedback control technique, a feedforward control technique, and/or an in situ control technique. The parameter of the process or the process tool may be altered manually or automatically.

The embodiments of the system 100 illustrated in FIGS. 1A-1C may be further configured as described herein. In addition, the system 100 may be configured to perform any other step(s) of any of the method embodiment(s) described herein.

Figure 2A:
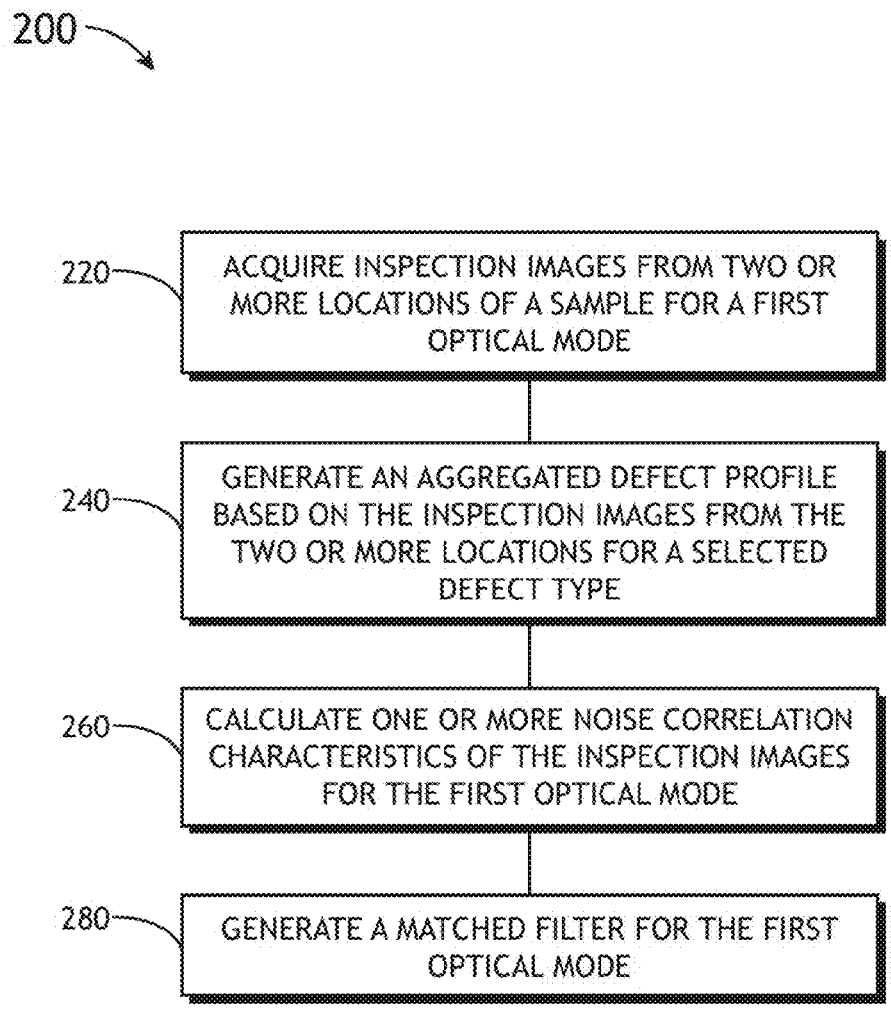
FIG. 2A is a process flow diagram depicting a method for enhanced defect detection with a matched filter, in accordance with one embodiment of the present disclosure.

FIG. 2A is a flow diagram illustrating steps performed in a method 200 generating a matched filter for optical inspection, in accordance with one embodiment of the present disclosure. It is noted herein that the steps of method 200 may be implemented all or in part by system 100. It is further recognized, however, that the method 200 is not limited to the system 100 in that additional or alternative system-level embodiments may carry out all or part of the steps of method 200.

In step 220, inspection images are acquired from two or more locations of a sample for a first optical mode. In one embodiment, as shown in FIGS. 1A-1C, the one or more detectors 118 of inspection sub-system 101 acquire two or more inspection images 106 from sample 104. For example, the one or more detectors 118 of inspection sub-system 101, operating in a first optical mode, may acquire two or more inspection images 109 from sample 104. It is noted herein that the first optical modes and/or any additional optical modes are implemented in any manner known in the art. For example, an optical mode may be implemented through the combination of any of the following: utilized spectral band, illumination level, illumination and/or collection apertures, illumination and/or collection polarization filters, magnification, focus offset, and the like. In this regard, a first optical mode may be formed with a first combination of settings including, but not limited to, spectral band, illumination level, illumination and/or collection apertures, illumination and/or collection polarization filters, magnification, focus offset, and the like. An additional optical modes (e.g., second optical mode, third optical mode, and the like) may be formed with an additional combination of settings, including, but not limited to, spectral band, illumination level, illumination and/or collection apertures, illumination and/or collection polarization filters, magnification, focus offset, and the like.

Figure 2B:
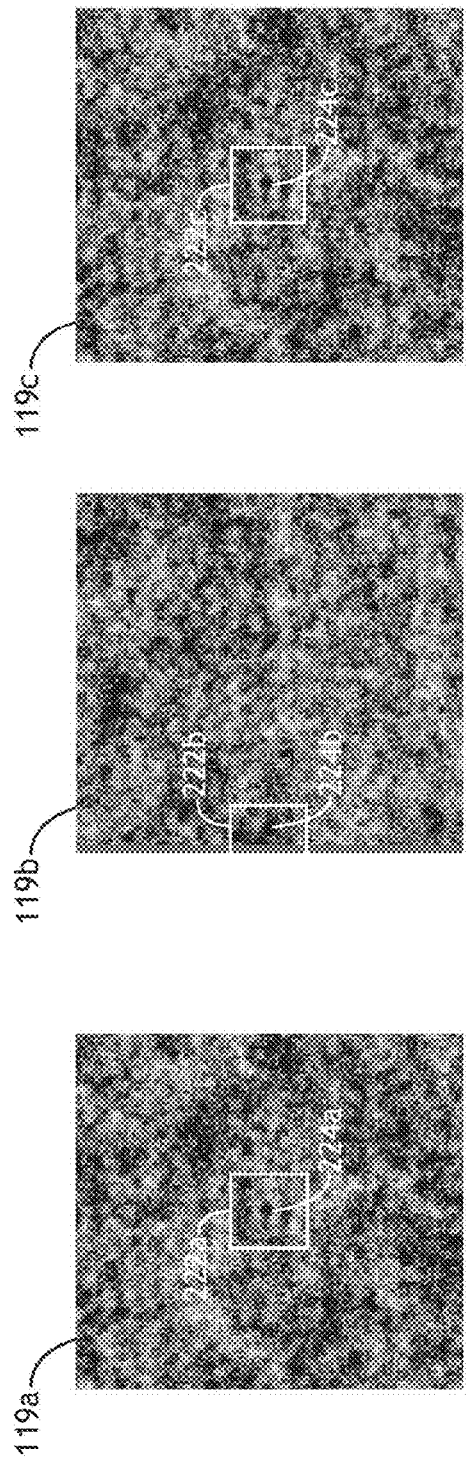
FIG. 2B illustrates a series of images depicting a set of defect regions from different locations for a sample, in accordance with one embodiment of the present disclosure.

For instance, FIG. 2B illustrates a set of digital inspection images 119a-119c (e.g., TDI difference images) collected from multiple locations of sample 104 with inspection sub-system 101. Images 119a-119c, which are obtained from different locations 222a-222c across the sample 104, contain unaligned defect regions 224a-224c (or patches) buried within the noisy optical background.

In another embodiment, once images 119 are acquired, the inspection sub-system 101 transmits the two or more inspection images 119 to one or more processors 124 of controller 103.

In step 240, an aggregated defect profile is generated based on the inspection images from the two or more locations for a selected defect type. In one embodiment, a defect type of interest (or a subset of the defects of sample 104) may be analyzed. In this regard, a user may select a defect type of interest for analysis via user interface 120. It is noted herein that the defect type of interest may include any defect type known in the art. For example, the defect type of interest may include, but is not limited to, a bridge defect, a protrusion defect, a surface particle, and the like. Defect classification may be carried out in any manner known in the art. For example, one or more defects may be classified by a user with an SEM review tool (not shown) prior to generation of the matched filter.

Based on the selection of a defect type of interest and/or a sub-set of the defects of the sample 104, system 100 and/or method 200 generate a matched filter tailored for the selected defect type or defect sub-set. Upon selection of a defect type or sub-set, the one or more processors 124 of controller 103 may generate the aggregated defect profile (e.g., averaged defect profile) for the selected defect type based on the inspection images 119 for the first optical mode. It is noted herein that a different aggregated defect profile may be generated for each of the optical modes used by system 100.

Figure 2C:
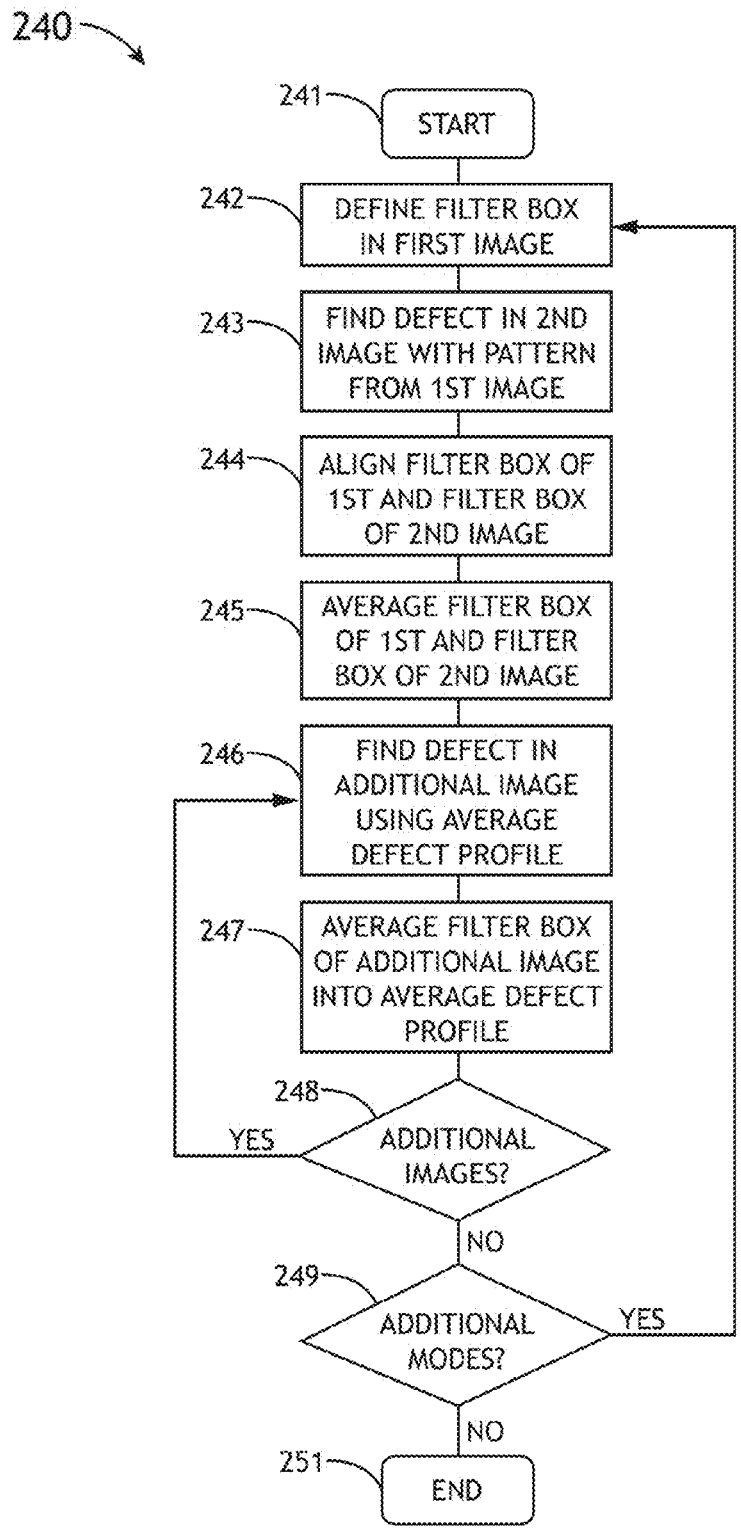
FIG. 2C is a process flow diagram depicting the generation of an aggregated defect profile, in accordance with one embodiment of the present disclosure.
Figure 2D:
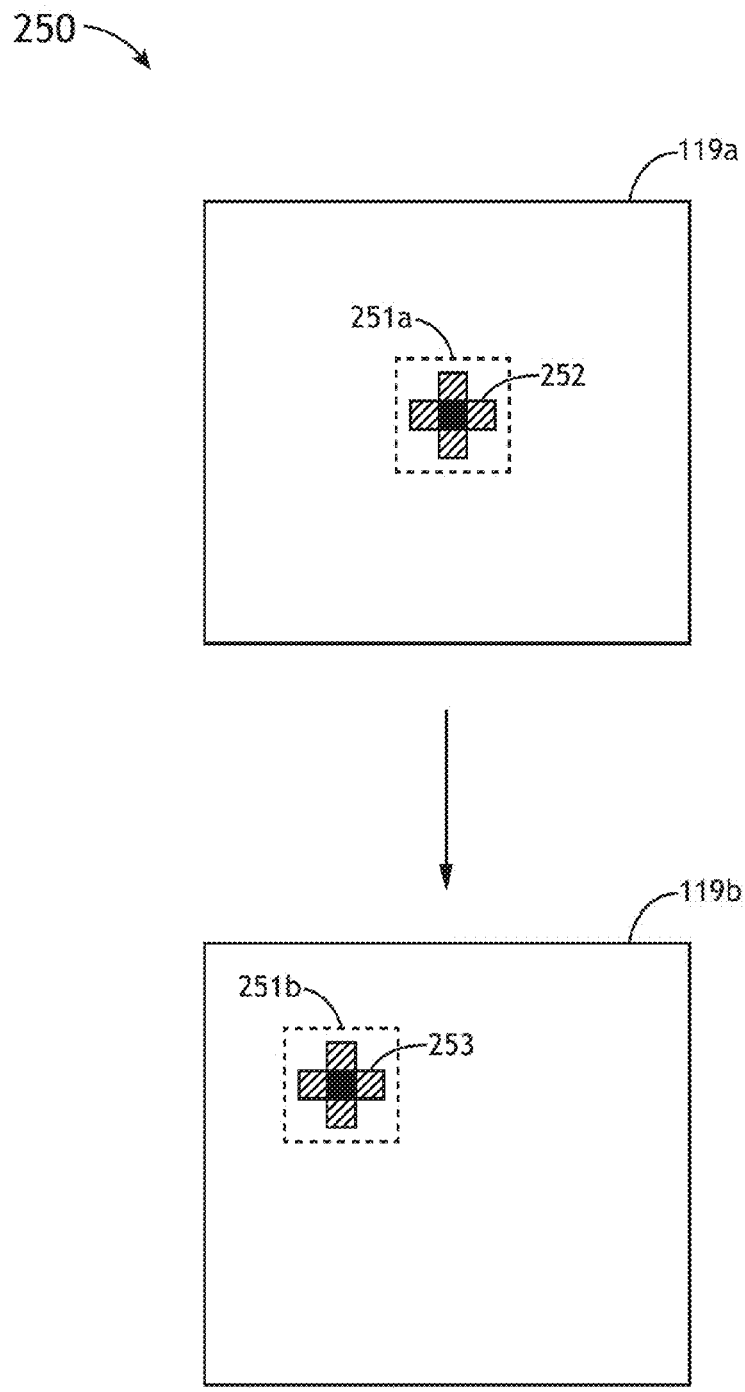
FIG. 2D illustrates a series of conceptual views depicting the identification of a defect in a first image and the identification of a matching defect in a second image based on the first image, in accordance with one embodiment of the present disclosure.

FIG. 2C illustrates an expanded process flow diagram depicting a process 240 of generating an aggregated defect profile for a first optical mode. In one embodiment, the generation of an aggregated defect profile starts at step 241. In step 242, the process includes defining a filter box in a first image. For example, as shown in FIG. 2D, a filter box 251a may be formed or placed on a first image 119a so as to surround a selected defect pattern 252. For instance, a user may utilize a drag and drop function to identify a region of the first image 119a as the filter box used for further analysis. By way of another example, one or more pattern identification and/or a machine learning algorithms may identify a defect and assign a filter box of selected size around the particular defect.

In step 243, the process includes identifying a defect in a second image. In one embodiment, the defect pattern found in the first image may be used by the one or more processors 124 to identify a matching defect pattern in the second image (or an Nth image). For example, as shown in FIG. 2D, a pattern 253 of the second image 119b that matches pattern 252 (or matches pattern 252 within a selected tolerance) of the first image 119a is identified. The filter box 251b may then be formed or placed on the second image 119b so as to encompass the identified matching pattern 253. It is further noted that a user may adjust the location of the filter box 251b via user interface 120 and display 122 in order to provide refined defect identification in the second image.

The first defect pattern 252 of the first image 119a may be used to find a second defect pattern 253 of the second image 119b in any manner known in the art. For example, system 100 may apply one or more pattern matching algorithms to match the first defect pattern 252 of the first image 119a to one or more patterns 253 in the second image 119b. In one embodiment, step 243 is performed with pixel-level accuracy. In this regard, defect locations and corresponding filter box locations are identified with pixel-level accuracy on the respective images 119a-119b. It is noted herein that this process may be repeated any number of times, allowing step 243 to identify matching defect patterns in any number of subsequent images based on the defect pattern identified in the first image.

In step 244, the process includes aligning the filter box of the first image and the filter box of the second image. For example, the one or more processors 124 of controller 103 may carry out a sub-pixel alignment process of the first filter box 251a of the first image 109a and the second filter box 251b of the second image 109b. For example, in order to achieve sub-pixel alignment, the one or more processors 124 may up-sample the one or more regions of the sample 104 contained in the filter boxes 251a, 251b. Then, following up-sampling, the one or more processors 124 may align the up-sampled image regions within the filter boxes 251a, 251b. The alignment of the up-sampled imagery data provides for accuracy at a sub-pixel level. In turn, following alignment of the up-sampled images within filter boxes 251a, 251b, the one or more processors 124 may down-sample the images within the filter boxes 251a, 251b to match the original image grid of the imagery data prior to up-sampling. The sub-pixel alignment procedure described herein is capable of achieving alignment well below the accuracy of a single pixel. For example, the sub-pixel alignment procedure of the present disclosure may achieve sub-pixel accuracy at or below $\frac{1}{10}$ of a pixel.

Figure 2E:
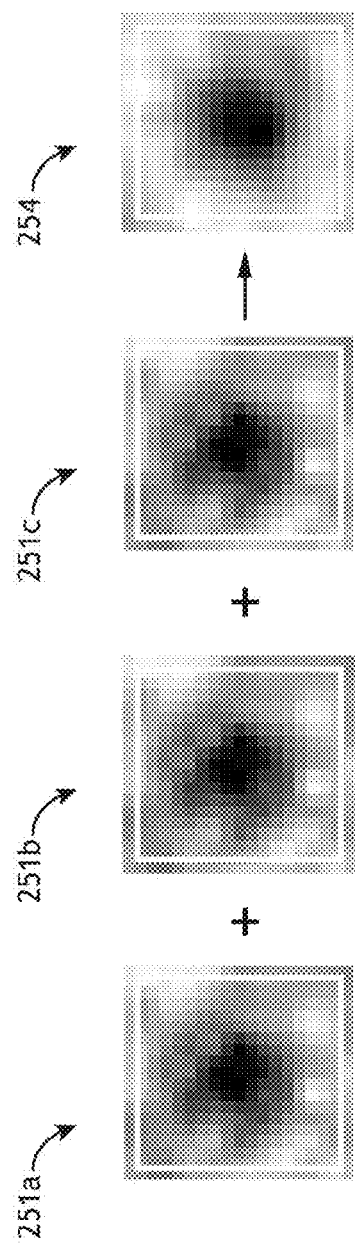
FIG. 2E illustrates a series of filter boxes associated with a series of defect regions and the averaged defect profile generated using the imagery data contained within each of the series of filter boxes, in accordance with one embodiment of the present disclosure.

In step 245, the process includes averaging (or aggregating) the filter box of the first image with the filter box of the second image to form an averaged defect profile. For example, after alignment of the filter boxes 251a, 251b, the one or more processors 124 of controller 103 may average the pixels within the filter box 251a of the first image 109a with the pixels within filter box 251b of the second image 109b. For example, FIG. 2E illustrates a series of filter boxes 251a-251c aggregated to form an averaged defect profile 254. It is noted that any image averaging technique known in the art may be used to average the pixel values of filter boxes 251a, 251b.

In step 246, the process includes identifying a defect in an additional image (e.g., third image). In one embodiment, the averaged defect profile 254 found in step 245 may be used by the one or more processors 124 to identify a matching pattern in a third image (or an Nth image). A filter box may then be formed or placed on the third image so as to encompass the identified matching pattern. It is further noted that a user may adjust the location of the filter box via user interface 120 and display 122 in order to provide refined defect identification in the third image. It is noted herein that this process may be repeated any number of times, allowing step 246 to identify matching defect patterns in any number of subsequent images based on the averaged defect profile 254 found in step 245.

In step 247, the process includes averaging the filter box of the additional image with the averaged defect profile 254 found in step 245. In this regard, the process may first align the average defect profile 254 with the filter box of the third image. For example, the one or more processors 124 of controller 103 may carry out a pixel-by-pixel alignment process of the pixels of the averaged defect profile 254 and the pixels of the third filter box of the third image. More generally, the one or more processors 124 of controller 103 may carry out a pixel-by-pixel alignment process of the pixels of the averaged defect profile 254 and the pixels of an Nth filter box of an Nth image.

In another embodiment, upon alignment of the filter box of the third image and the averaged defect profile 254, the one or more processors 124 may carry out an averaging process on the averaged defect profile 254 and the filter box of the third image to form a refined averaged defect profile 254.

It is noted that the alignment and averaging of filter boxes of additional images into the averaged defect profile 254 may be repeated for all images acquired by the inspection sub-system 101. In step 248, if there are additional images then the YES branch is taken and step 246 is repeated. If there are no additional images for analysis then the NO branch is taken and the process moves to step 249.

As noted previously herein, the averaged defect profile 254 generation process may be repeated for each selected optical mode. In step 249, if there are additional optical modes to analyze then the YES branch is taken and the process moves to step 242, whereby an additional optical mode is analyzed. If there are no additional optical modes to analyze then the NO branch is taken and the process moves to end step 251.

Referring again to FIG. 2A, in step 260 of process 200, one or more noise correlation characteristics of the inspection images 109 are calculated for the first optical mode. In one embodiment, the one or more noise characteristics calculated in step 260 include one or more noise correlation matrices of the two or more inspection images 109 acquired from the two or more locations for the first optical mode of the inspection sub-system 101.

Figure 2F:
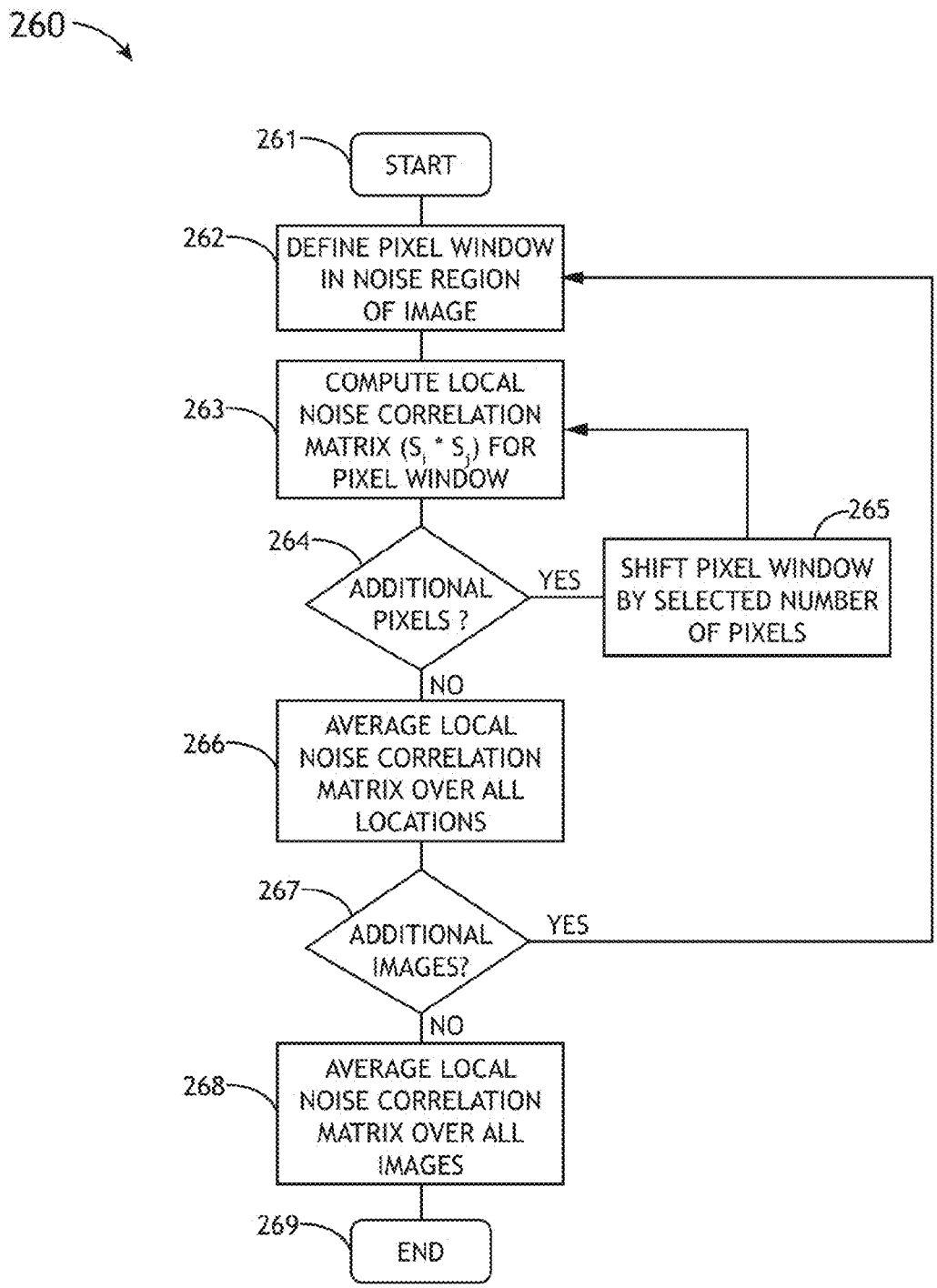
FIG. 2F is a process flow diagram depicting the calculation of one or more noise correlation characteristics of inspection images for a selected optical mode, in accordance with one embodiment of the present disclosure.

FIG. 2F illustrates an expanded process flow diagram 260 depicting the process of calculating a noise correlation matrix of the inspection images 109, in accordance with one or more embodiments of the present disclosure. It is noted herein that the steps of flow chart 260 of FIG. 2F are not to be interpreted as limiting and are provided merely for illustrative purposes.

Figure 2G:
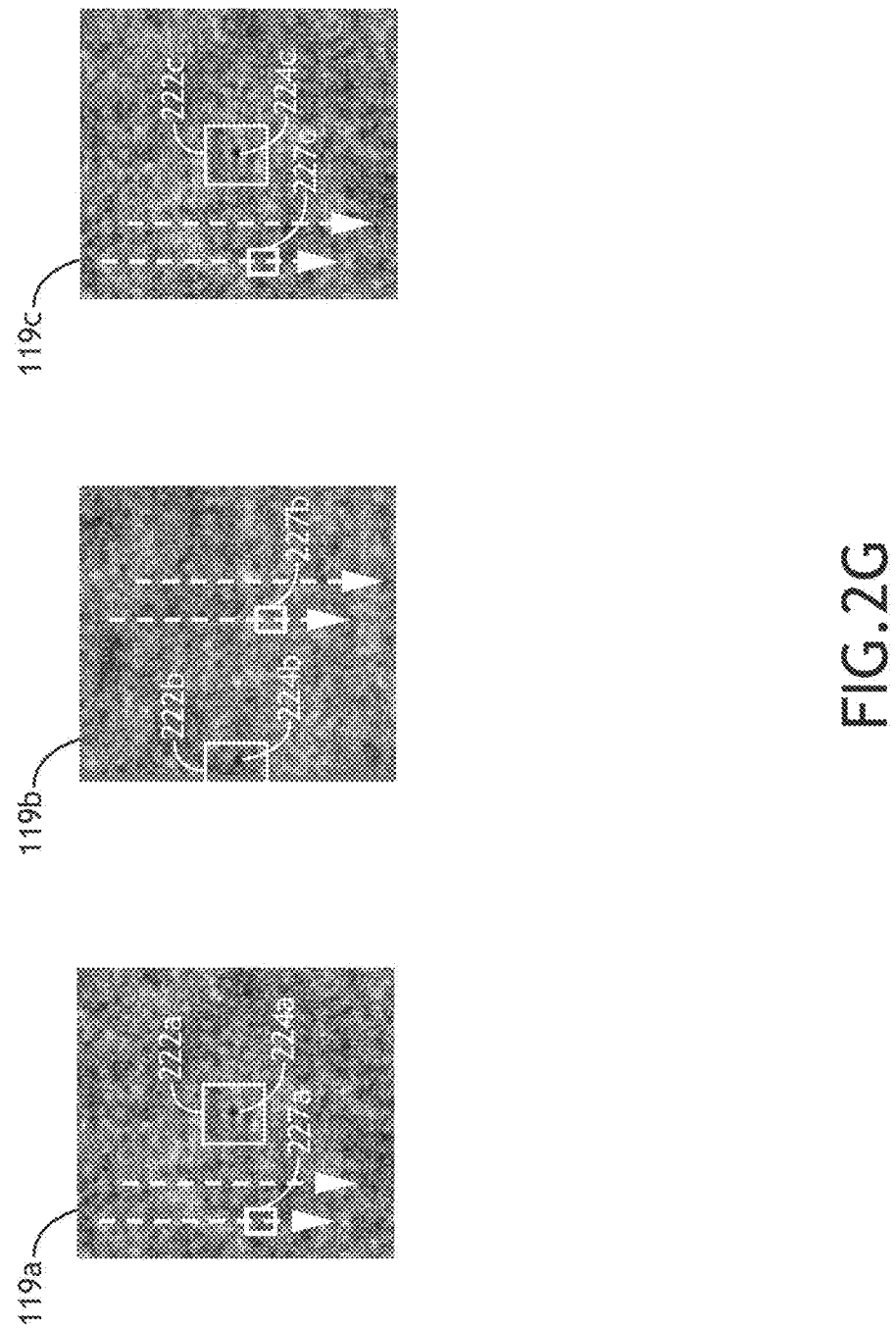
FIG. 2G illustrates a pixel window for calculating a local noise correlation matrix for one or more inspection images, in accordance with one embodiment of the present disclosure.

In one embodiment, the process starts at step 261. In step 262, the process includes defining a pixel window in a noise region of an image. For example, as shown in FIG. 2G, a pixel window 227a may be defined within the noise regions of an inspection image 119a. For instance, a N×M pixel window (e.g., 9×9 pixel window) may be placed in a noise region of the images 119a.

In step 263, the process includes computing a local noise correlation matrix for the pixel window 227a. For example, the local noise correlation matrix M may be computed as a signal product $(S_i*S_j)$ for each pixel pair within the N×M pixel window. In this regard, each of the i and j indices run over all N×M pixels of the given pixel window 227a. For example, in the case of a 9×9 window, each of the i and j indices run over all 81 pixels of the given pixel window 227a. In this case, the dimensionality of the correlation matrix is $N^2 \times M^2$, which in the case of a 9×9 window, corresponds to a dimensionality of 81 or $9^2 \times 9^2$.

In step 264, the process includes determining whether additional pixels need to be analyzed. If additional pixel analysis is needed, the YES branch is taken to step 265.

In step 265, the process includes shifting the pixel window by a selected number of pixels. For example, as shown in FIG. 2G, the pixel window 227a for images 119a may be shifted by one pixel (e.g., shifted in X- or Y-direction) within the noise region of image 119a. After the pixel window 227a is shifted by one or more pixels, the process moves to step 263 and the local correlation matrix $M=S_i*S_j$ is calculated again. Steps 263-265 are repeated until all desired pixels of the given inspection image 119a are iterated through. After the desired pixels of the noise region of the inspection image 119a have been iterated through, the NO branch is taken to step 266.

In step 266, the process includes averaging the local noise correlation matrices from all pixel locations in the image 119a to form an averaged noise correlation matrix for image 119a. In this regard, each location corresponds to a shifted version of the pixel window created by the process in step 265 and computed by the process in step 263.

In step 267, the process includes determining whether additional images need to be analyzed. If additional images are used to compute the correlation matrix, the YES branch is taken and steps 262-266 are repeated. For example, as shown in FIG. 2G, steps 262-266 may be repeated using pixel windows 227b, 227c for images 119b, 119c, respectively. Alternatively, if additional images are not used for calculation of the noise correlation matrix, the NO branch is taken to step 268.

In step 268, the process includes averaging the local noise correlation matrices over all images 119a-119c to form an averaged noise correlation matrix. In step 269, the process ends. It is noted that if only one image is used then step 268 is bypassed and the process moves to end step 269.

Referring again to FIG. 2A, in step 280 of process 200, a matched filter for the first optical mode is generated. In one embodiment, the matched filter is generated based on the aggregated defect profile (step 240) and the calculated one or more noise correlation characteristics (step 260). For example, the matched filter may be computed using the aggregated defect profile D and the noise correlation matrix M. In this regard, the matched filter (MF) may take the form:

$$MF=M^{-1}*Dv$$

where Dv is a reshaped vector or column N×M (e.g., 9×9) pixel aggregated (or averaged) defect patch based on the initial aggregated defect profile D. The formation of a matched filter is described generally by Dimitris G. Manolakis and Vinay K. Ingle, "Applied Digital Signal Processing: Theory and Practice," p. 860, Cambridge University Press, 2011, which is incorporated herein by reference in the entirety. The formation of a matched filter is also described generally by N. E. Mastorakis, "Multidimensional Matched Filters," Proceedings of the Third IEEE International Conference on Electronics, Circuits, and Systems, vol. 1, p. 467, 1996, which is incorporated herein by reference in the entirety.

Figure 2H:
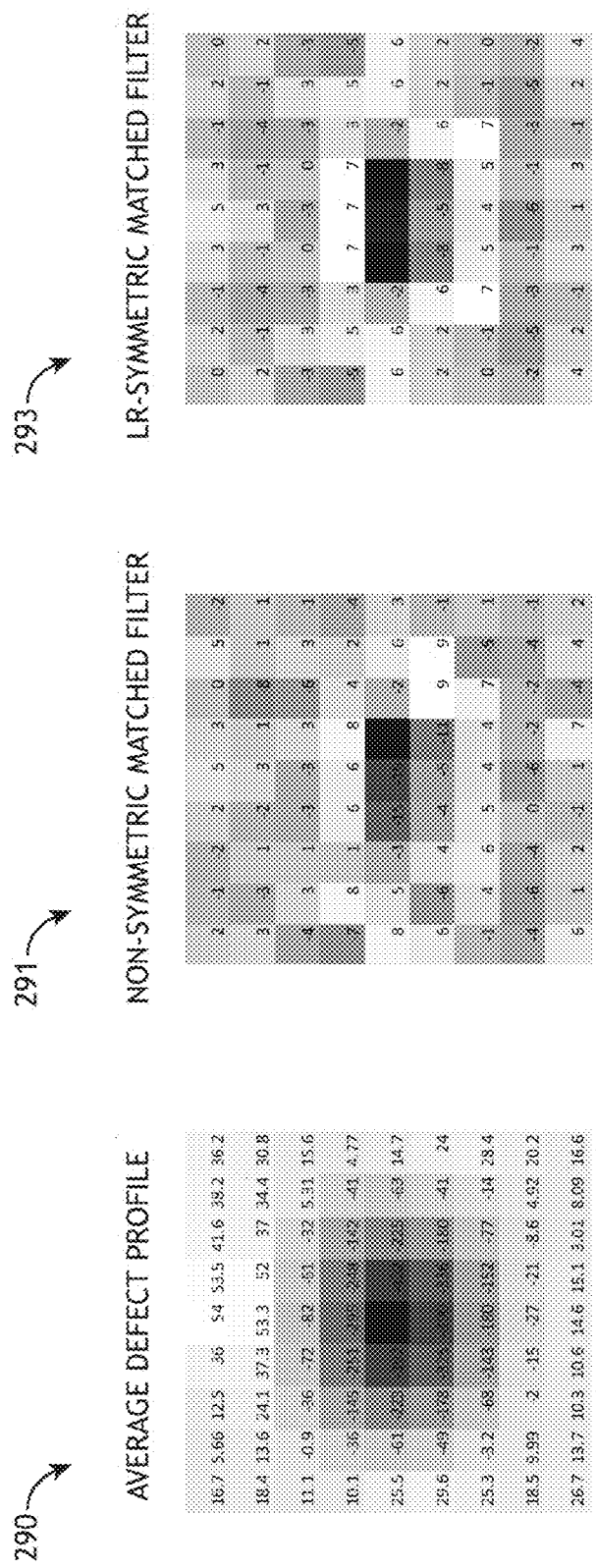
FIG. 2H illustrates an averaged defect profile, a non-symmetric matched filer, and a LR-symmetric matched filter, in accordance with one embodiment of the present disclosure.

It is noted herein that the matched filter generated by step 280 may be formed as a non-symmetric matched filter or a left-right (LR) symmetric matched filter. FIG. 2H illustrates an averaged defect profile 290, a non-symmetric matched filter 291, and left-right symmetric matched filter 293. As shown in FIG. 2H, the matched filters 291 and 293 differ significantly from the averaged defect profile 290. This difference is a result of the strong noise pixel-to-pixel correlation within the N×M pixel window described previously herein.

Figure 2I:
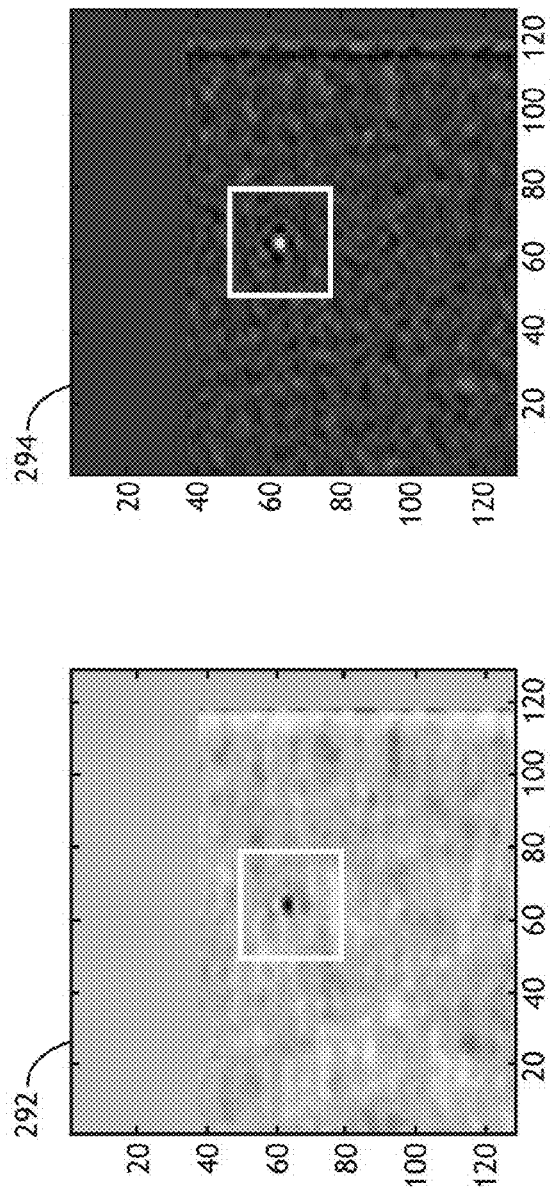
FIG. 2I illustrates an unfiltered defect image and a digitally filtered image consisting of a convolution of the unfiltered defect image and a generated matched filter, in accordance with one embodiment of the present disclosure.

Referring again to FIG. 2A, in an additional step to method 200, the one or more processors 124 of controller 103 may apply the matched filter generated in step 280 to one or more inspection images 119 received from the inspection sub-system 101. In one embodiment, the one or more processors 124 convolve one or more acquired defect images 119 with the generated matched filter 291 (or filter 293). For example, FIG. 2I illustrates an unfiltered defect image 292 and a digitally filtered image 294 consisting of a convolution of the unfiltered defect image 292 and the generated matched filter 291. It is noted herein that the convolution of the unfiltered defect image 292 and the generated matched filter 291 may be carried out using any image convolution procedure known in the art.

In an additional step to method 200, a matched filter 291 may be generated for each optical mode used to capture the inspection images 119. For example, the one or more processors 124 may generate a first matched filter for a first optical mode, a second matched filter may be generated for a second optical mode and a third matched filter may be generated for a third optical mode. More generally, an Nth matched filter may be generated for an Nth optical mode.

In another embodiment, the one or more processors 124 may apply the generated matched filters to images of the corresponding optical modes to calculate one or more image parameters. The image parameters may include any digital image parameters known in the art, such as, but not limited to, signal-to-noise ratio (SNR), signal value, noise value and the like. Then, the one or more processors 124 may compare the filtered output for the images of the multiple optical modes. Based on this comparison, the one or more processors 124 may rank the multiple optical modes as a function of a parameter of interest (e.g., SNR values(s), noise value(s), signal value(s) and the like).

While much of the present disclosure has focused on the generation of matched filters for a particular defect type or sub-group, it is noted herein that this is not a limitation on the present disclosure. For example, the system 100 and method 200 of the present disclosure may be extended to provide for the generation of multiple matched filters for a given image. In this regard, the system 100 and/or method 200 may divide the various defects present in an image into a set of defect types or sub-groups based on the filter box images. Then, a matched filter may be generated for each of the set of defect sub-groups.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include, but are not limited to, physically mateable and/or physically interacting components, and/or wirelessly interactable and/or wirelessly interacting components, and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method comprising:
   acquiring two or more inspection images from a sample from two or more locations of the sample for a first optical mode;
   generating an aggregated defect profile based on the two or more inspection images from the two or more locations for the first optical mode for a selected defect type;
   calculating one or more noise correlation characteristics of the two or more inspection images acquired from the two or more locations for the first optical mode; and
   generating a matched filter for the first optical mode based on the generated aggregated defect profile and the calculated one or more noise correlation characteristics.

2. The method of claim 1, further comprising:
   applying the generated matched filter to an acquired inspection image for the first optical mode to form a first filtered image.

3. The method of claim 2, wherein the applying the generated matched filter to an acquired inspection image for the first optical mode comprises:
   convolving the generated matched filter with an acquired inspection image for the first optical mode.

4. The method of claim 2, further comprising:
   acquiring two or more inspection images from the sample from two or more locations of the sample for an additional optical mode;
   generating an additional aggregated defect profile based on the two or more inspection images from the two or more locations for the additional optical mode for a selected defect type;
   calculating one or more additional noise correlation characteristics of the two or more inspection images acquired from the two or more locations for the additional optical mode;
   generating an additional matched filter for the additional optical mode based on the generated additional aggregated defect profile and the calculated one or more additional noise correlation characteristics; and
   applying the additional generated matched filter to at least one of the two or more acquired inspection images for the additional optical mode to form an additional filtered image.

5. The method of claim 4, further comprising:
   comparing the first filtered image to the additional filtered image to rank the first optical mode and the additional optical mode.

6. The method of claim 1, wherein the generating an aggregated defect profile based on the two or more inspection images from the two or more locations for the first optical mode for a selected defect type comprises:
   generating an averaged defect profile based on the two or more inspection images from the two or more locations for the first optical mode for a selected defect type.

7. The method of claim 1, wherein the calculating one or more noise correlation characteristics of the two or more inspection images acquired from the two or more locations for the first optical mode comprises:
   calculating one or more noise correlation matrices of the two or more inspection images acquired from the two or more locations for the first optical mode.

8. The method of claim 1, wherein the acquiring two or more inspection images from a sample from two or more locations of the sample for a first optical mode comprises:
   acquiring two or more inspection images from a sample from two or more locations of the sample for a first optical mode via a darkfield inspection process.

9. The method of claim 1, wherein the acquiring two or more inspection images from a sample from two or more locations of the sample for a first optical mode comprises:

acquiring two or more inspection images from a sample from two or more locations of the sample for a first optical mode via a brightfield inspection process.

10. A system comprising:
an inspection sub-system including an illumination source configured to direct illumination onto one or more selected portions of a sample and one or more detectors configured to acquire two or more inspection images from the sample from two or more locations of the sample for a first optical mode; and
a controller communicatively coupled to the one or more detectors, the controller including one or more processors configured to execute program instructed configured to cause the one or more processors to:
receive the two or more inspection images acquired from the two or more locations from the one or more detectors for the first optical mode;
generate an aggregated defect profile based on the two or more inspection images from the two or more locations received from the one or more detectors for the first optical mode for a selected defect type;
calculate one or more noise correlation characteristics of the two or more inspection images acquired from the two or more locations for the first optical mode; and
generate a matched filter for the first optical mode based on the generated aggregated defect profile and the calculated one or more noise correlation characteristics.

11. The system of claim 10, wherein the one or more processors are further configured to:
apply the generated matched filter to an acquired inspection image for the first optical mode to form a first filtered image.

12. The system of claim 11, wherein the one or more processors are further configured to:
convolve the generated matched filter with an acquired inspection image for the first optical mode.

13. The system of claim 11, wherein the one or more processors are further configured to:
acquire two or more inspection images from the sample from two or more locations of the sample for an additional optical mode;
generate an additional aggregated defect profile based on the two or more inspection images from the two or more locations for the additional optical mode for a selected defect type;
calculate one or more additional noise correlation characteristics of the two or more inspection images acquired from the two or more locations for the additional optical mode;
generate an additional matched filter for the additional optical mode based on the generated additional aggregated defect profile and the calculated one or more additional noise correlation characteristics; and
apply the additional generated matched filter to at least one of the two or more acquired inspection images for the additional optical mode to form an additional filtered image.

14. The system of claim 13, wherein the one or more processors are further configured to:
compare the first filtered image to the additional filtered image to rank the first optical mode and the additional optical mode.

15. The system of claim 10, wherein the generating an aggregated defect profile based on the two or more inspection images from the two or more locations for the first optical mode for a selected defect type comprises:
generating an averaged defect profile based on the two or more inspection images from the two or more locations for the first optical mode for a selected defect type.

16. The system of claim 10, wherein the calculating one or more noise correlation characteristics of the two or more inspection images acquired from the two or more locations for the first optical mode comprises:
calculating one or more noise correlation matrices of the two or more inspection images acquired from the two or more locations for the first optical mode.

17. The system of claim 10, wherein generated matched filter comprises:
a non-symmetric matched filter.

18. The system of claim 10, wherein generated matched filter comprises:
a left-right-symmetric matched filter.

19. The system of claim 10, further comprising:
one or more display devices.

20. The system of claim 10, further comprising:
one or more user input devices.

21. The system of claim 10, wherein inspection sub-system comprises:
a brightfield inspection sub-system.

22. The system of claim 10, wherein inspection sub-system comprises:
a darkfield inspection sub-system.

23. The system of claim 10, wherein the illumination source comprises:
at least one of a broadband illumination source or a narrowband illumination source.

24. The system of claim 10, wherein the one or more detectors comprise:
at least one of a TDI detector or a CCD detector.

25. The system of claim 10, wherein the sample comprises:
at least one of a semiconductor wafer, a reticle, or a biological specimen.

* * * * *